Dec. 9, 1958
J. KAMLET
2,863,726
PROCESS FOR THE JOINT MANUFACTURE
OF PORTLAND CEMENT AND SULFUR
Filed March 31, 1955
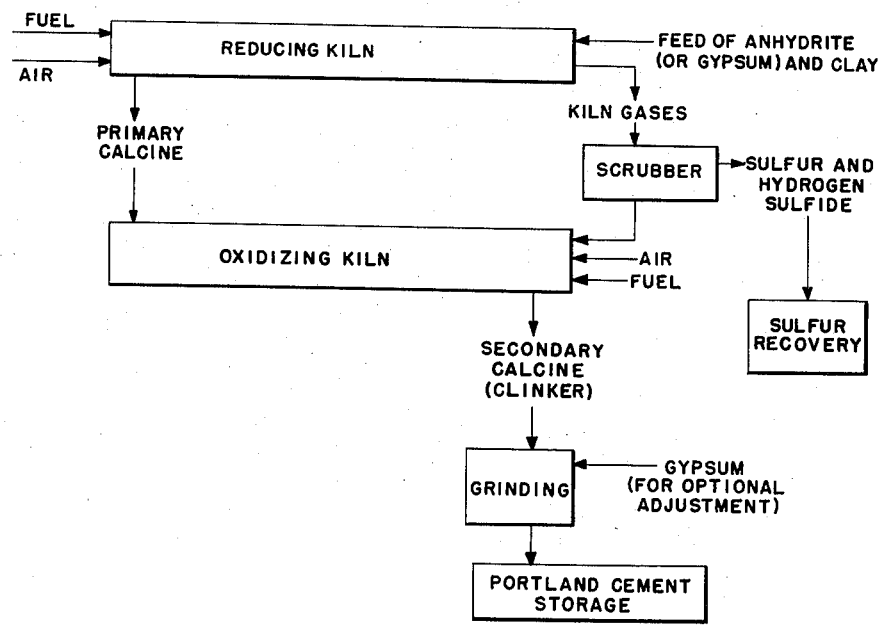
INVENTOR
Jonas Kamlet United States Patent Office 2,863,726
Patented Dec. 9, 1958

2,863,726
PROCESS FOR THE JOINT MANUFACTURE OF PORTLAND CEMENT AND SULFUR

Jonas Kamlet, New York, N. Y.

Application March 31, 1955, Serial No. 498,449

18 Claims. (Cl. 23—181)

This invention relates to a process for the joint manufacture of Portland cement clinker and sulfur. More particularly, it relates to a modification and improvement in the well known existing processes for the manufacture of Portland cement clinker wherein a calcium sulfate-containing raw material is substituted for at least a portion of the calciferous component of the kiln feed, and sulfur and hydrogen sulfide are recovered as valuable co-products of said process. Since hydrogen sulfide is readily converted to elemental sulfur by the processes of the art, the substantial purpose of this invention is to provide an economical process, competitive with the processes of the prior art, whereby both Portland cement clinker and elemental sulfur are manufactured from cheap and readily available raw materials, including calcium sulfate-containing products as the source of said sulfur.

It has been known for some time that it is technically feasible to substitute a calcium sulfate-containing raw material (e. g. gypsum, anhydrite, alabaster, etc.) for at least a portion of the calciferous component of the kiln feed in the classical Portland cement processes, together with a carefully controlled amount of a source of carbon (e. g. powdered coal or powdered coke), and that this kiln feed could then be burned (i. e. calcined, sintered or roasted) in an oxidizing atmosphere to obtain a good grade of Portland cement clinker and kiln gases containing from 4.0% to 8.5% of sulfur dioxide. The only practical industrial use for these $SO_2$-containing kiln gases is for the preparation of sulfuric acid at the same plant site. Such plants for the joint manufacture of Portland cement clinker and sulfuric acid are now known to be operated at Miramas (near Marseilles), France; at Wolfen in Saxony, Germany; at Billingham, England; at Leverkusen, Germany; at St. Chamas, France; at Merseyside, England, and at an undisclosed site in the Soviet Union.

Although sulfuric acid is by far the largest industrial outlet for elemental sulfur, the economic laws of supply and demand often produce an oversupply of sulfuric acid at the production site and a scarcity of sulfuric acid at a distant site. It is as a rule much more desirable to ship elemental sulfur than it is to ship sulfuric acid (which contains the equivalent of only 32.7% of sulfur). In addition, there are many industrial outlets where elemental sulfur (or products derivable from elemental sulfur) are required (such as hydrogen sulfide, sodium sulfide, colloidal sulfur, insoluble sulfur, sodium hydrosulfite, liquid sulfur dioxide, etc.), and the recovery of elemental sulfur from the modified Portland cement processes of the prior art above described has not heretofore been commercially feasible.

It is therefore the further purpose of this invention to provide an economical commercial process for the manufacture of Portland cement clinker from a calcium sulfate-containing raw material, whereby sulfur and hydrogen sulfide are recovered as co-products, rather than a kiln gas containing sulfur dioxide as has heretofore been the case. It is a further purpose of this invention to provide a commercially practical process for the recovery of elemental sulfur from the huge deposits of calcium sulfate-containing minerals (chiefly gypsum and anhydrite) available throughout the world. Other purposes of this invention will become obvious in the course of my description thereof in this specification.

The earlier development of a joint process for the manufacture of Portland cement clinker and $SO_2$-containing kiln gases which are converted to sulfuric acid at the plant site has been described in considerable detail. (See Muller, Zeit. angewandte Chemie 39, 169 (1926); Kuhne, Chem. Ing. Techn. 21, 227 (1949); Bedwell, "The Production of Sulfuric Acid From Calcium Sulfate," Royal Institute of Chemistry Lecture #3 (1952); Seailles, British Patent 643,479 (1950); Revue des Produits Chemiques, 54, #4, 42 (1952); Manning and Maclennan, U. S. Patent 2,687,946 (1954); Horn, U. S. Patent 2,426,147 (1947); Manning, "Sulfuric Acid and Cement from Anhydrite," Proceedings No. 5 of the Fertiliser Society (London) (1951); Hasselbach, U. S. Patent 1,801,741 (1931); Bayer & Co., German Patent 388,849 (1924); Cathala, Proceedings International Congress Pure and Applied Chemistry (London), 11, 35–48 (1947); Gavanda, Mitteilungen Chem. Forschungs-Institute Indust. Osterreich 3, 70–73 (1949); Edwards, Chemistry and Industry, August 1952, pp. 764–773; Zawadzski, Przeglad Chem. (Poland) 5, 239–254 (1947); Publication Board Reports 3417, 48665, 52008, 52196, 70038, 85172, 90817, 100766, 100766S, 102227, 102227S; Willson, U. S. Patent 2,528,103 (1950); Seailles, Cement and Lime Manlfacture, 20, #1, 1–7 (1947); Chemical and Process Engineering 36, #1, 1 (1955); Manufacturing Chemist, December 1954, 523–4, 539–542; Chemical and Process Engineering, December 1954, 375–8; Chemical and Engineering News, December 6, 1954, 4849–4850; Higson, Chemical and Engineering News, 29, #43, 4469–4474 (1951); Imperial Chemical Industries, Manning and Maclennan, British Patents 694,035 and 694,036 (1953); Brown, U. S. Patent 769,467 (1904); Basset, U. S. Patent 1,168,046 (1916); Zernigibl and Zur Strassen, U. S. Patent 2,252,279, (1941).)

In the processes above described, the basic reactions involve the feeding of a mixture of a calcium sulfate-containing mineral (such as gypsum or anhydrite), a carefully and closely proportioned amount of carbon (e. g. powdered coal or coke) and an argillaceous material (such as clay or kaolin) or a source of silica (such as sand) and alumina (such as bauxite) to a rotary kiln where it is burned (or calcined, sintered or roasted) in an oxidizing atmosphere, to a terminal temperature of 1400° C. (in the firing zone) whereby there is produced a good grade of Portland cement clinker and kiln gases containing 4.0% to 8.5% of sulfur dioxide (which are converted at the site to sulfuric acid in contact converter plants). The two most important and vital aspects of this process must be emphasized herewith. These are:

(a) The burning of the kiln feed must be effected in an oxidizing atmosphere, otherwise there is obtained a clinker containing too much calcium sulfide which makes for unsoundness in the cement and yields a completely unacceptable product.

(b) The amount of carbon added to the kiln feed (as powdered coal or as powdered coke) must be closely and critically adjusted. An excess of carbon gives a clinker with too much calcium sulfide which resists desulfurization in the oxidizing atmosphere of the kiln. Muller and Kuhne (cited above) describe the sausage-like masses, often several meters thick and several yards in length, which formed in the kiln alternating with a molten mass which ran out and coated the clinker. Too little carbon in the kiln feed caused considerable calcium sulfate to remain undecomposed in the oxidizing atmosphere of the kiln, yielding clinkers which are unacceptable under any international standard Portland cement specifications. (See Manning (cited above), page 18, and Bedwell (cited above), pp. 9–12.)

My invention is based on a completely different approach to these two critical requirements of the processes of the prior art. The basis of my invention is the following sequence of steps:

(a) A mixture of a calcium sulfate-containing material, a source of silica and a source of alumina are fed to a rotary kiln and burned (or calcined, sintered or roasted) in a reducing atmosphere in the presence of a carbon monoxide containing gas, to a temperature of 900° C. to 1000° C. to produce a primary calcine or sinter (containing some calcium sulfide) and a kiln gas containing gaseous sulfur and hydrogen sulfide;

(b) The kiln gases of the primary calcine of step (a) are cooled and processed to recover sulfur and hydrogen sulfide by the methods well known to the art; and (c) The primary calcine or sinter obtained in step (a) is then submitted (preferably without intermediate cooling) to a second burning, calcining, sintering or roasting, this time in an oxidizing atmosphere, whereby the small amounts of calcium sulfide residual in the calcine or sinter after the first burning are oxidized to calcium sulfate and to yield a Portland cement clinker containing well under the maximum permissible limit of 2.5% $SO_3$ (present as $CaSO_4$).

In the process of my invention, it is absolutely not necessary or critical to add a source of carbon (e. g. powdered coal or powdered coke) to the kiln feed. Such materials may optionally be added to said kiln feed if desired, as a means of facilitating the intimate admixture of the components of said feed, and as a means of accelerating the rate of interaction, but said addition is completely optional. Excellent Portland cement clinkers may be obtained without such additions of carbon. In addition the amounts of carbon added are neither critical, closely regulable or essential as in the processes of the prior art but may vary over wide limits. The carbon added to the kiln feed as powdered coal or coke simply adds its fuel valve in the burning of the clinker, as if it were fed at the firing end of the kiln as fuel.

However, the most critical and important novelty and improvement of my invention is to employ a two kiln process, the first kiln being operated in a reducing atmosphere in the presence of carbon monoxide gas and the second kiln being operated in an oxidizing atmosphere wherein the calcine or sinter from the first kiln (containing too much calcium sulfide to make it acceptable as clinker) is oxidized to an acceptable Portland cement clinker containing less than 2.5% $SO_3$ (as $CaSO_4$). The terminal temperature in the first kiln is 900° C. to 1000° C. The terminal temperature in the second kiln is not in excess of 1450° C.

My invention may best be understood by a seriatim discussion of the various aspects thereof and by reference to the drawing of the flow-sheet of the process of this invention appended to this specification.

The calcium sulfate-containing raw material for the process of my invention may be chosen from the group of minerals consisting of gypsum, anhydrite, alabaster, plaster of Paris, selenite, terra alba, satinite, mineral white, satin spar and light spar, or it may be a chemical by-product calcium sulfate such as is obtained in the "wet-process" for the manufacture of phosphoric acid and phosphates, in the manufacture of hydrofluoric acid from fluorspar, etc.

The argillaceous raw materials for the process of this invention (i. e. the source of alumina and silica, which almost invariably contain minor amounts of iron oxides) are chosen from the group consisting of clays, shales, bauxites, kaolins, slates, blast-furnace slags, metallurgical slags, ashes, cement rocks, marls, sands and sandstones.

The source of carbon (when used, and its use is optional) may be powdered coal, powdered coke, powdered charcoal or in fact any comminuted carbonaceous material.

The calcium sulfate-containing raw material is now admixed with sufficient quantities of argillaceous (i. e. aluminous and siliceous) materials from the group above described and (optionally) a source of carbon (preferably comminuted) to obtain a kiln feed containing, by weight, on a dry basis:

From 136.0 to 175.0 parts of calcium sulfate
From 3.0 to 12.0 parts of aluminum oxide
From 17.0 to 26.0 parts of silicon dioxide
From 2.0 to 6.0 parts of iron oxides
From none to 50.0 parts of carbon As in the old and well known cement processes of the art, this mixture may be prepared for the kiln to be further processed to Portland cement clinker by either the "dry" process or the "wet" process.

In the "dry" process, the above admixture of components is proportioned, dried, ground to a uniform fineness (about 20 mesh) and blended. The mixed materials then pass through finishing mills, in which the fineness is brought to about 200 mesh. The raw materials are then passed to the cement kiln and burned in the usual manner to a Portland cement clinker.

In the "wet" process, the above admixture of components is proportioned, ground to a uniform fineness (at least 85% passing through a 200 mesh screen) and made into a slurry with water, the water content of the slurry being between 35% and 70%. This slurry is fed to the cement kiln and burned to a Portland cement clinker, the water content of the slurry being volatilized and carried over as steam with the kiln gases.

No attempt will be made in the present instance to describe in any detail the processes involved in drying, proportioning, grinding and preparing the raw materials required for the kiln feed, the burning of the mix to clinker or the subsequent treatment of the clinker in the manufacture of the various types of Portland cement. All of this is well known to persons skilled in the art.

A very considerable amount of work has been done on the utilization of calcium sulfate (in the form of gypsum, anhydrite, by-product calcium sulfate from various chemical processes, etc.) as the complete replacement of limestone in the classical cement kiln feed mix. The reaction:

$$CaSO_4 \rightarrow CaO + SO_2 + O_2 - 116.4 \text{ Cal.}$$

goes to completion at 1590° C. at atmospheric pressure. This is considerably higher than the maximum temperatures in the clinkering zone of the cement kiln (i. e. 1400° C. to 1500° C.). Even under reduced pressures, high temperatures are required for the purely thermal degradation of calcium sulfate (e. g. 1000° C. at 8 mm. pressure; 1230° C. at 98 mm. pressure). As a result of a good deal of perliminary investigation (reviewed by Neumann in the Zeitschrift für Angewandte Chemie, 39, 1537 (1926), it was found that this decomposition temperature could be materially lowered in the presence of aluminum oxide, silicon dioxide and/or iron oxides, whereas Schott (quoted in the Zeitschrift für Angewandte Chemie, 39, 171 (1926)) had found that, in the presence of one mole of carbon per mole of calcium sulfate, the reaction:

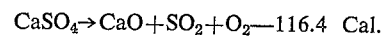

$$CaSO_4 + C \rightarrow CaO + SO_2 + CO - 87.4 \text{ Cal.}$$

is completed at 900° C. at one atmosphere pressure, i. e. well below the temperature of the clinkering zone of the cement kiln. All of the above work was done in kilns fired in an oxidizing atmosphere.

The reduction of calcium sulfate with carbon monoxide or with carbon commences at a much lower temperature (700° C.), is very rapid between 800° C. and 900° C. and is complete at 1000° C. (Hofman and Mostowitsch, Trans. Amer. Inst. Mining Engrs. 39, 628 (1909)). With carbon, it is 10% complete at 800° C., 90% complete at 900° C. and 99% complete at 1000° C. With carbon monoxide, it is 3% complete at 700° C., 35% complete at 800° C., 99% complete at 900° C., and 100% complete well under 1000° C. Thus, carbon monoxide is a much more efficient reducing agent than is elemental carbon.

I have found that this reaction is markedly accelerated by the presence of metal oxides, such as alumina, silica, iron oxides, etc. (i. e. the other components of the cement kiln feed mix), and that the calcium sulfate is reduced at temperatures well below 1000° C. in the presence of these metal oxides, in a reducing atmosphere containing carbon monoxide (the reducing agent being either the said carbon monoxide or the carbon optionally added to the kiln feed mix), to elemental sulfur and a primary calcine or sinter, e. g.

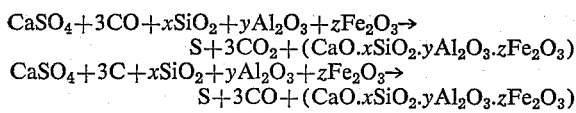

where $x$, $y$ and $z$ can vary over certain ranges and the final complexes represent the various recognized components of Portland cement clinker, i. e.

Tricalcium silicate, $3CaO.SiO_2$
Dicalcium silicate, $2CaO.SiO_2$
Tricalcium aluminate, $3CaO.Al_2O_3$
Tetracalcium aluminoferrite, $4CaO.Al_2O_3.Fe_2O_3$ and possibly other binary, ternary and quaternary compounds and series of solid solutions.

A secondary reaction may also occur in the first burning kiln, between the sulfur formed, the reducing atmosphere (i. e. the carbon monoxide) and the water vapor formed by the combustion of the fuel or introduced by a wet kiln feed mix:

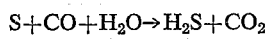

Thus, as little as 10% and as much as 90% of the sulfur present in the kiln gases of the primary calcine or burning is present as hydrogen sulfide, the remainder being present as elemental sulfur, with minor amounts of organic sulfur compounds.

The calcine or sinter from the first kiln will contain calcium sulfide, in amounts as high as 2.5%, which makes it unsuitable for direct use, without further treatment, as Portland cement clinker.

The fuel employed in the burning of the kiln fuel mix in the first step of this process may be any of the conventional solid, liquid or gaseous natural or synthetic fuels, e. g. powered anthracite or bituminous coal, coke, petroleum coke (by-product of the petroleum refining industry), charcoal, petroleum, petroleum fractions (such as gasoline, kerosene, fuel oils, heavy oils), natural gas, producer gas, coke oven gas, etc. The preferred fuels are natural gas, petroleum fuel oils and powered coal.

The fuel is atomized and/or vaporized and is burned with a limited amount of an oxygen-containing gas, so as to maintain a reducing atmosphere high in carbon monoxide within the kiln. While oxygen may be employed, if it is cheaply available at the plant site, the preferred oxygen-containing gas for use in the incomplete combustion of the fuel in this process is, of course, air.

The gases leaving the kiln, containing sulfur, hydrogen sulfide, carbon monoxide, hydrogen, nitrogen and other products of reaction, diluents and incomplete combustion gases are now processed in any desirable manner to recover the $H_2S$ and sulfur content thereof. A prefered (but by no means critical) procedure involves passing the hot kiln gases through a waste heat boiler or heat exchange unit to recover some of the thermal energy content thereof, and thereafter scrubbing the cooled gases with water or preferably with liquid sulfur. If liquid sulfur (i. e. sulfur above its melting point) is used to scrub the cooled gases, the liquid sulfur cools the gases further and retains the sulfur content thereof. Sulfur is bled off continuously or intermittently to storage vats and allowed to solidify to a product of over 99.9% purity.

The kiln gases, free of sulfur, are now treated in any manner to recover the hydrogen sulfide content thereof. Thus, the gases may be burned with a limited amount of air, sufficient to convert the $H_2S$ to sulfur. An alternate method involves the well known procedure of absorbing the $H_2S$ in an absorbent solution such as diethylene glycol, ethanolamine, tripotassium phosphate, sodium phenolate, sodium carbonate, sodium thioarsenate, N-methyldiethanolamine, etc., and recovering therefrom in the well known manner an enriched or concentrated $H_2S$ for conversion to sulfur, sulfur dioxide or sulfuric acid, or for transportation by pipeline as is described in my co-pending application Serial No. 494,220, filed March 14, 1955, now abandoned.

The cooled kiln gases, freed of sulfur and hydrogen sulfide, still contain carbon monoxide, hydrogen, incomplete products of combustion, etc. and possess considerable fuel values. These gases may be recycled to the process for use as partial or total fuels in the firing of the second kiln (i. e. the oxidizing atmosphere kiln).

The hot sinter or calcine from the first (reducing atmosphere) kiln (preferably without intermediate cooling) is passed directly to a second kiln where it is submitted to a second roasting, sintering, calcining or burning, this time in an oxidizing atmosphere. This second (oxidizing) kiln is fired with any of the conventional fuels above listed and/or with the CO-containing gases (freed of sulfur and $H_2S$) recovered from the first (reducing atmosphere) kiln. The fuel is vaporized and/or comminuted and is burned with an excess of an oxygen-containing gas, such as air, so as to maintain an oxidizing atmosphere within the kiln. The calcium sulfide in the calcine or sinter is oxidized to calcium sulfate in this oxidizing atmosphere. The second (oxidizing atmosphere) kiln is fired to a terminal temperature at the firing zone not in excess of 1450° C., where the calcine or sinter is partially or incipiently fused and converted to a Portland cement clinker containing less than the maximum permissible limit of 2.5% $SO_3$ (as $CaSO_4$).

The residence period within both kilns may vary over wide limits of time, but the total reaction time within both kilns is approximately the same as is the case in the well known present day Portland cement processes.

The clinker thus obtained may be cooled, stored and ground with gypsum (as required) as a retarder by the well known method now used for the finish grinding of clinker to Portland cement. The dusty kiln gases from the second (oxidizing atmosphere) kiln may then be passed through an electrical precipitator (to lay and collect the dust) and then vented to the atmosphere through a stack (Hull, Hass and Franklin, Ind. Eng. Chem. 46, 830–842 (1954)).

The clinker obtained from the hot end of the kiln has the following composition:

| | Percent |
|---|---|
| Calcium oxide | 57.0 to 66.0 |
| Aluminum oxide | 3.0 to 12.0 |
| Silicon dioxide | 17.0 to 26.0 |
| Iron oxide (as $Fe_2O_3$) | 2.0 to 6.0 |
| Sulfur trioxide | 0.25 to 2.5 | these components being present in the clinker in the forms of tricalcium silicate ($3CaO.SiO_2$), tricalcium aluminate ($3CaO.Al_2O_3$), dicalcium silicate ($2CaO.SiO_2$), and complex calcium aluminoferrites and calcium aluminosilicates. All five types of Portland cement recognized in the United States may be made by the process of the present invention, i. e. I, general construction; II, moderate heat of hardening; III, high early-strength; IV, low heat; and V, sulfate-resisting.

The clinker obtained above may be aged, ground and mixed with the usual cement adjuvants, in accordance with the well known practices of the art. Thus, additional gypsum may be added as a retarder, powdered blast furnace slag may be added to obtain a Portland slag, trass or pozzolana cement, et cetera.

In the process of this invention, about 60% to 85% of the total fuel is consumed in the first (reducing atmosphere) kiln, the remainder in the second (oxidizing atmosphere) kiln. An approximate raw materials balance of this process may be given as follows:

3900 lbs. anhydrite (or 4950 lbs. gypsum)
210 lbs. clay or kaolin
44 gals. fuel oil (18,500 B. t. u./lb.) or 6500 cu. ft. natural gas (1175 B. t. u./cu. ft.)
   will yield
2000 lbs. Portland cement clinker
700 to 750 lbs. sufur (as combined S and $H_2S$)

The following examples are given to define and to illustrate this invention but in no way to limit it to reagents, proportions or conditions described therein. Obvious modifications and improvements will occur to any persons skilled in the art. All proportions given are in parts by weight.

*Example I.—Dry process*

A dry kiln feed mix of anhydrite and clay, containing 156 parts of $CaSO_4$, 8.0 parts of $Al_2O_3$, 22.5 parts of $SiO_2$ and 4.5 parts of $Fe_2O_3$ is prepared and fed to a rotary kiln, fired with natural gas and sufficient air to produce a strongly reducing atmosphere containing carbon monoxide. The kiln feed is roasted for a total period of two hours during which the kiln gases are recovered, collected, cooled and scrubbed in sequence through molten sulfur and a $H_2S$-recovery system. The terminal temperature at the hot end of this kiln attains 1000° C.

The hot calcine from this kiln is transferred directly to a second kiln where it is fired with a mixture of natural gas and the scrubbed gas (freed of S and $H_2S$) from the first kiln, together with sufficient air to produce a strongly oxidizing atmosphere. This kiln feed is roasted for a total period of one hour to a terminal temperature in the firing zone of 1400° C. The hot clinker thus obtained is cooled and stored. There is thus obtained 100 parts of a good Portland cement clinker and 31 parts of sulfur (as combined S and $H_2S$).

*Example II.—Wet process*

A wet slurry (containing 35% of solids) of gypsum, clay and powdered coal is prepared containing the equivalent of 170 parts of $CaSO_4$, 7.0 parts of $Al_2O_3$, 18.0 parts of $SiO_2$, 5.0 parts of $Fe_2O_3$ and 25.0 parts of carbon, and is fed to a rotary kiln, fired with vaporized fuel oil and sufficient air to produce a strongly reducing atmosphere containing carbon monoxide. The kiln feed is roasted for a total period of 2.5 hours during which the kiln gases are recovered, collected, cooled and scrubbed in sequence through molten sulfur and a $H_2S$-recovery system. The terminal temperature at the hot end of this kiln attains 950° C.

The hot calcine from this kiln is transferred directly to a second kiln where it is fired with a mixture of vaporized fuel oil and the scrubbed gas (freed of S and $H_2S$) from the first kiln, together with sufficient air to produce a strongly oxidizing atmosphere. This kiln feed is roasted for a total period of 1.5 hours to a terminal temperature in the firing zone of 1400° C. The hot clinker thus obtained is cooled and stored. There is thus obtained 35 parts of sulfur and 100 parts of a Portland cement clinker analyzing 61.1% CaO, 7.5% $Al_2O_3$, 22.5% $SiO_2$, 4.5% $Fe_2O_3$ and 1.8% $SO_3$.

Having described my invention, what I claim and desire to protect by Letters Patent is:

1. A process for the joint manufacture of Portland cement clinker, sulfur and hydrogen sulfide which comprises the steps of: (a) feeding a mixture of a calcium sulfate-containing raw material, a source of alumina and a source of silica, in proportions to produce Portland cement clinker, to a rotary kiln and burning said mixture in a reducing atmosphere containing carbon monoxide to produce a calcine containing calcium sulfide and kiln gases containing sulfur and hydrogen sulfide; (b) recovering sulfur and hydrogen sulfide from the kiln gases of said burning; and (c) burning the calcine from step (a) in a second rotary kiln in an oxidizing atmosphere to a state of incipient fusion to oxidize the calcium sulfide to calcium sulfate and to obtain a Portland cement clinker.

2. The process of claim 1 in which the calcium sulfate-containing raw material is chosen from the group consisting of gypsum, anhydrite, alabaster, plaster of Paris, selenite, terra alba, satinite, mineral white, satin spar, light spar and chemical by-product calcium sulfate.

3. The process of claim 1 in which the calcium sulfate-containing raw material is gypsum.

4. The process of claim 1 in which the calcium sulfate-containing raw material is anhydrite.

5. The process of claim 1 in which the source of silica and the source of alumina is chosen from the group consisting of clays, shales, bauxites, kaolins, slates, blast furnace slags, metallurgical slags, ashes, cement rocks, marls, sands and sandstones.

6. The process of claim 1 in which the source of silica and the source of alumina is a clay.

7. The process of claim 1 in which the mixture fed to the first kiln in step (a) contains:

From 136.0 to 175.0 parts of calcium sulfate
From 3.0 to 12.0 parts of aluminum oxide
From 17.0 to 26.0 parts of silicon dioxide
From 2.0 to 6.0 parts of iron oxide
From none to 50.0 parts of carbon 8. The process of claim 1 effected as a "dry" process in which the kiln feed mix in step (a) is fed to the kiln in a substantially dry comminuted state.

9. The process of claim 1 effected as a "wet" process in which the kiln feed mix in step (b) is fed to the kiln as an aqueous slurry.

10. The process of claim 1 in which the fuel employed in either kiln is chosen from the group of conventional fuels consisting of natural gas, petroleum, petroleum fractions, fuel oil, comminuted coal, comminuted coke, producer gas, comminuted charcoal and coke oven gas.

11. The process of claim 1 in which the fuel is burned in the first (reducing atmosphere) kiln in the presence of sufficient oxygen-containing gas to produce a reducing atmosphere containing carbon monoxide.

12. The process of claim 1 in which the oxygen-containing gas is air.

13. The process of claim 1 in which the kiln gases from step (a) are passed in step (b) through water to recover the sulfur content of said gases.

14. The process of claim 1 in which a source of carbon is admixed with the kiln feed in step (a).

15. The process of claim 1 in which the first kiln in step (a) is fired in a reducing atmosphere containing carbon monoxide.

16. The process of claim 1 in which the second kiln in step (c) is fired in an oxidizing atmosphere.

17. The process of claim 1 in which the first (reducing atmosphere) kiln is fired to a maximum temperature between 900° C. and 1000° C.

18. The process of claim 1 in which the second (oxidizing atmosphere) kiln is fired to a maximum temperature not in excess of 1450° C.

References Cited in the file of this patent

UNITED STATES PATENTS

| | | |
|---|---|---|
| 1,198,816 | Basset | Sept. 19, 1916 |
| 1,168,046 | Basset | Jan. 11, 1916 |
| 1,244,280 | Basset | Oct. 23, 1917 |
| 1,972,883 | Gleason | Sept. 11, 1934 |
| 2,426,147 | Horn | Aug. 19, 1947 |
| 2,724,641 | Butler | Nov. 24, 1955 |
| 2,740,691 | Burwell | Apr. 3, 1956 |